United States Patent [19]

Ogawa

[11] 3,902,008

[45] Aug. 26, 1975

[54] DATA TRANSMISSION SYSTEM

[75] Inventor: Mutsuo Ogawa, Tokyo, Japan

[73] Assignee: Ricoh Co., Ltd., Tokyo, Japan

[22] Filed: Oct. 4, 1973

[21] Appl. No.: 403,660

[30] Foreign Application Priority Data

Oct. 4, 1972 Japan ............................ 47-99605

[52] U.S. Cl. .............. 178/6; 178/DIG. 3; 179/2 TV

[51] Int. Cl. .............................................. H04n 5/78

[58] Field of Search ......... 178/DIG. 3; 179/15.55 R, 179/15.55 T, 2 TV

[56] References Cited

UNITED STATES PATENTS

| | | | |
|---|---|---|---|
| 2,941,040 | 6/1960 | Schreiber | 179/15.55 |
| 2,996,581 | 8/1961 | Lord | 179/15.55 |
| 3,311,707 | 3/1967 | Urquhart-Pullen | 179/15 |
| 3,725,573 | 4/1973 | Wachtel | 178/6.6 DD |
| 3,800,080 | 3/1974 | Fuwa | 178/7.1 |

*Primary Examiner*—Howard W. Britton
*Assistant Examiner*—Edward L. Coles
*Attorney, Agent, or Firm*—Cooper, Dunham, Clark, Griffin & Moran

[57] ABSTRACT

Analog signals are quantized and converted into digital N-pulse binary code to represent $2^N$ discrete levels. The digital coded signals are subjected to data compression in such a way that bits in the same digit position are compressed and then transmitted.

12 Claims, 4 Drawing Figures

DATA TRANSMISSION SYSTEM

BACKGROUND OF THE INVENTION

The present invention relates to a data transmission system, and more particularly a system for converting analog data obtained by scanning a halftone image or by measuring a temperature, pressure or the like into digital data and effecting data compression of the digital data for transmission.

In facsimile and telemetering systems, a digital data transmission system is generally employed. In the digital data transmission system, analog information to be transmitted is quantized and converted into digital N-pulse binary code to represent $2^N$ discrete levels. Binary coded signals thus obtained are serially transmitted over a carrier wave.

There has long been a need for a facsimile system which may transmit video information of a halftone image over a commercial telephone line with a relatively narrow band. However when analog video information of a halftone image is transmitted over a commercial telephone line it is impossible to reproduce correctly the halftone image. The quality of reproduced image is not satisfactory. This problem may be overcome to some extent by a digital data transmission system, but the number of digital signals to represent discrete levels of analog signals must be considerably increased in order to reproduce correctly and faithfully a halftone image. Therefore the transmission time is prohibitively increased.

In view of the above, one of the objects of the present invention is to provide an improved digital data transmission system capable of transmitting digital data within a time hitherto impossible by any conventional digital data transmission system without degrading the quality of the reproduced halftone image.

Another object of the present invention is to provide an improved digital data transmission system which may be applied not only to a facsimile system for transmitting and reproducing a halftone image but also to other systems for transmitting various analog signals.

SUMMARY OF THE INVENTION

Quantized signals obtained by sampling and quantizing analog signals which in turn are obtained by scanning a halftone image whose tone is continuously varied, are generally maintained a certain level for a certain time, and when their levels change, change in level is one or two levels at the most. Therefore when they are converted into binary code, a relatively large number of "1s" or "0s" continues in succession. In general the higher the digit is, the more this phenomenon is pronounced. The present invention is based upon this observed fact so that the binary coded signals may be data-compressed digit by digit for transmission.

According to one preferred embodiment of the present invention, analog video signals obtained by scanning a subject copy or halftone image are sampled, quantized and converted into parallel $2^N$ pulse binary code, and bits of respective digit positions are stored in parallel in a plurality of shift registers. That is, the bit pattern of the least significant digit position is stored in the first shift register; the bit pattern of the next least significant digit position in the second shift register; and so on. The bit pattern of the most significant digit position is therefore stored in the n-th shift register. Thus, for example, the binary coded signals of one scanning line, that is the signals representing the levels of tone of elemental areas or picture elements in one scanning line are stored in a plurality of shift registers. The contents of the shift registers are serially read out one registers by one register, and are compressed by a data compressor, which may be one which is widely used in the facsimile system and which compresses the data based upon a run-length of 1s or 0s. The output signals, to be referred to as "the compressed signals" in this specification, of the data compressor are transmitted through a modem over a commercial telephone line. In a receiving station, the above operations are reversed. That is, the received compressed signals are expanded by an data expander and are stored into a plurality of shift registers for respective digit positions. As soon as the binary coded signals of one scanning line are stored in them, the contents are read out in parallel in a manner substantially similar to that described above and converted into analog signals for recording or reproduction.

The above and other objects, features and advantages of the present invention will become more apparent from the following description of one preferred embodiment thereof taken in conjunction with the accompanying drawing.

Figure 1:
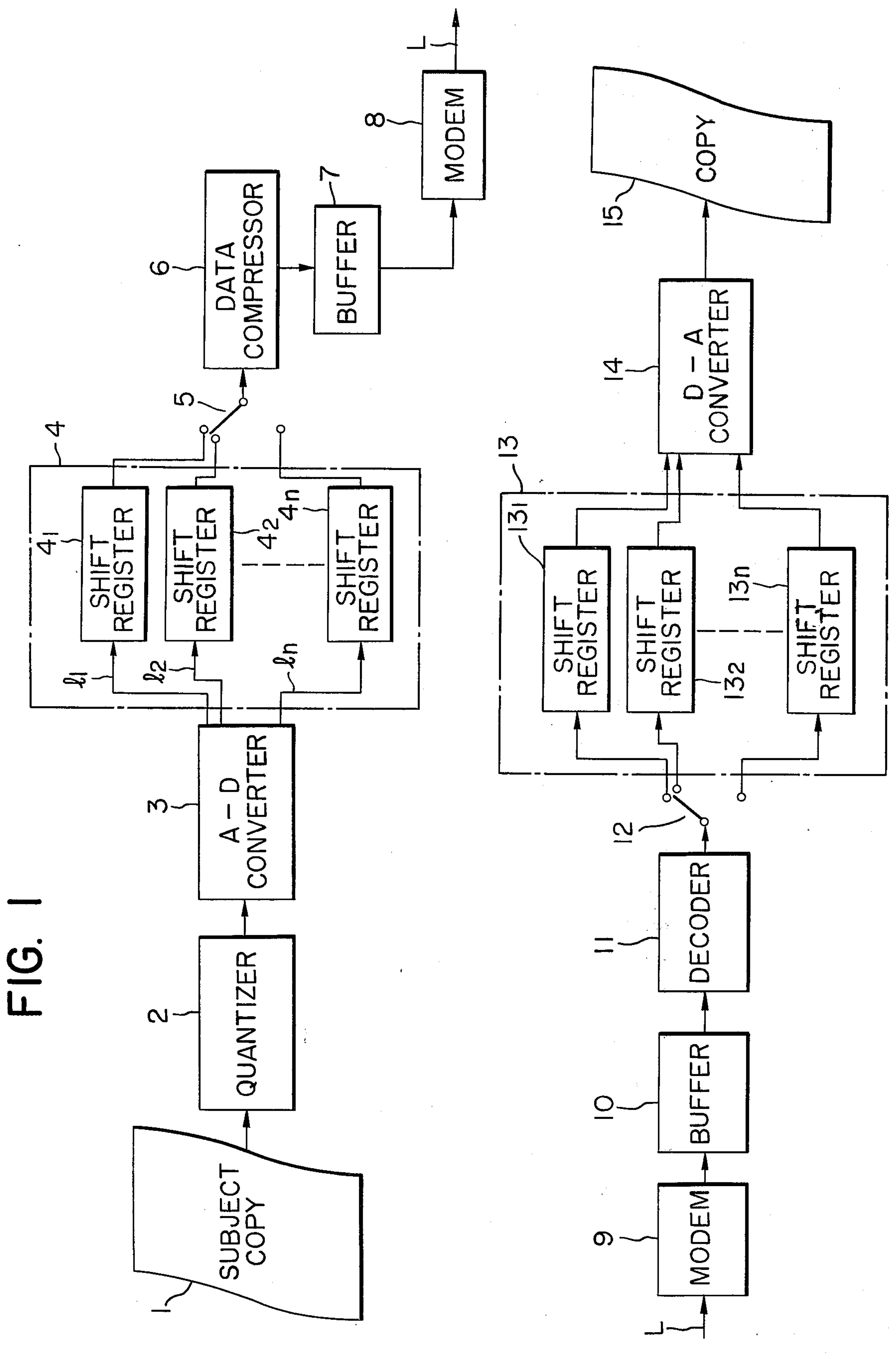
FIG. 1 is a block diagram of a data transmission system of the present invention.

DESCRIPTION OF THE PREFERRED EMBODIMENT:

Referring to FIG. 1 illustrating in block diagram a data transmission system in accordance with the present invention, a halftone image or subject copy 1 is scanned by any suitable conventional scanning means to be converted into electrical analog video signals or continuously varying message waves the level of which represents the levels of tone of the halftone image. The analog video signals are quantized by a quantizer 2 into multi-level or quantized signals which are converted by an analog-digital converter 3 into parallel binary coded signals of for example three-pulse code permitting seven levels in the instant embodiment. Output lines $l_1$, $l_2$, . . ., $l_n$ of the analog-digital converter 3 have weights $2^0, 2^1, \ldots, 2^n$ (in the instant embodiment, $2^0$, $2^1$, and $2^2$). Therefore the seven discrete levels may be represented by Code Table below in the instant embodiment.

| output line \ level | 0 | 1 | 2 | 3 | 4 | 5 | 6 | 7 |
|---|---|---|---|---|---|---|---|---|
| $l_1$ | 0 | 1 | 0 | 1 | 0 | 1 | 0 | 1 |
| $l_2$ | 0 | 0 | 1 | 1 | 0 | 0 | 1 | 1 |
| $l_3$ | 0 | 0 | 0 | 0 | 1 | 1 | 1 | 1 |

CODE TABLE

The coded signal are transmitted in parallel from the analog-digital converter 3 to a buffer 4 comprising a plurality of shift registers $4_1, 4_2, \ldots, 4_n$ (three shift registers in the instant embodiment). That is, the shift register $4_1$ is coupled through the analog-digital converter 3 through the output line $l_1$; the shift register $4_2$, through the output line $l_2$; and so on. Therefore the bits in the least significant digit position are stored in the shift register $4_1$; the bits in the next least significant digit position, in the shift register $4_2$; and so on. The bits in most significant digit position are stored in the shift register $4_n$. Thus the coded signal representing the level of tone of an elementary area of the halftone image is transmitted through the output lines $l_1, l_2, \ldots, l_n$ and stored into the shift registers $4_1, 4_2, \ldots, 4_n$ each of which has the capacity capable of storing the bits in each digit position of each scanning line.

The coded signals stored in the shift registers $4_1, 4_2, \ldots, 4_n$ are read out one shift register by one shift register through a selector switch 5 to be applied to a data compressor 6. The data compressor 6 may be of any suitable conventional type. For example, it detects a run-length of logic 1s or 0s, that is the number of logic 1s or 0s which continuously and successively appear, and generates a coded signal representing this run-length. Since the construction and mode of operation of the data compressor of the type described are well known to the art, no detailed description will be made in this specification.

The compressed data signals generated by the data compressor 6 are transmitted through a data transmission speed conversion buffer 7 and a modem 8 onto an outgoing line L. In like manner the compressed data signals for each scanning line are transmitted. However it will be understood that when the capacities of the shift registers $4_1, 4_2, \ldots, 4_n$ are increased, the compressed data signals for a plurality of scanning lines may be transmitted in one time.

The compressed data signals transmitted through an incoming line L are applied through a modem 9 and a data transmission speed conversion buffer 10 to a decoder 11 so that they are converted into the original coded signals, that is the signals similar to the input signals to the data compressor 6 in the facsimile transmitter. Since the construction and mode of operation of the decoder or data expansion means 11 are well known in the art no more detailed explanation thereof will be made in this specification. The decoded or expanded signals are applied from the decoder 11 through a selector switch 12 to shift registers $13_1, 13_2, \ldots, 13_n$ which constitute a buffer 13. The signals are stored in the shift registers $13_1, 13_2, \ldots, 13_n$ in a manner substantially similar to that described hereinbefore with reference to the shift registers $4_1, 4_2, \ldots, 4_n$. The signals stored in the shift registers $13_1, 13_2, \ldots, 13_n$ are read out in parallel to be applied to a digital-to-analog converter 14 so that they are converted into the multi-level signals, that is the signals representing seven discrete levels of tone of the halftone image or subject copy 1. Thus a copy 15 is obtained.

Figure 2:
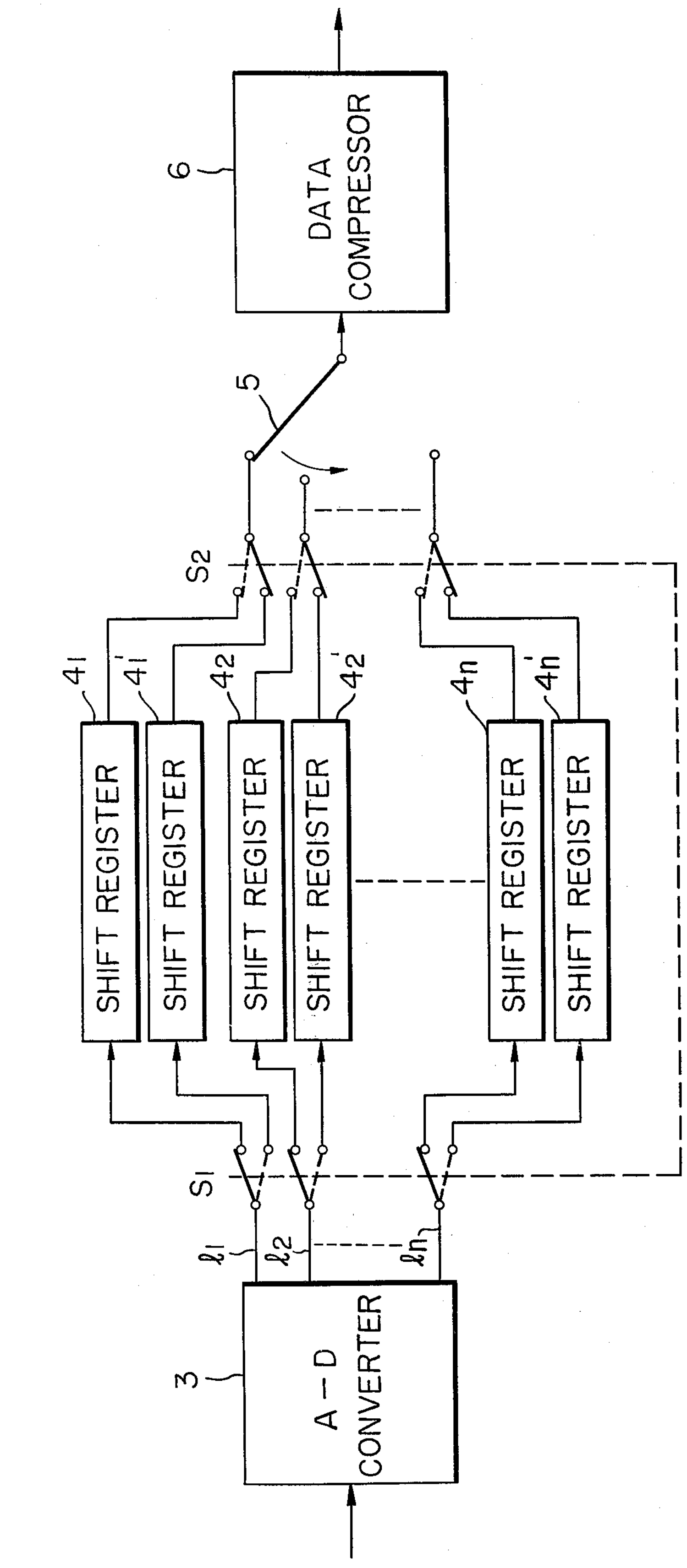
FIG. 2 is a view illustrating a variation of a buffer indicated by 4 in FIG. 1.

In the facsimile system described so far with reference to FIG. 1, when the data stored in the shift registers $4_1, 4_2, \ldots, 4_n$ are being read out through the selector switch 5 into the data compressor 6, the scanning of the subject copy 1 must be temporarily interrupted, but according to the present invention the continuous scanning is possible when two shift registers $4_1$ and $4_1'$; $4_2$ and $4_2'$, . . .; $4_n$ and $4_n'$ are provided for respective digit positions as shown in FIG. 2. That is, the coded signals or bits in the least significant digit position of the first and second scanning lines or alternate scanning lines are stored into the shift registers $4_1$ and $4_1'$, respectively. In like manner, the bits in the other significant digit positions of the alternate scanning lines are stored into the shift registers $4_2$ and $4_2'$; . . .; $4_n$ and $4_n'$, respectively. Selector switches $S_1$ and $S_2$ are interlocked to each other. Assume that the selector switches $S_1$ and $S_2$ are in the positions indicated by the solid lines in FIG. 2. Then, the coded signals from the analog-digital converter 3 are stored through the selector switches $S_1$ into the shift registers $4_1, 4_2, \ldots, 4_n$ in a manner substantially similar to that described with reference to FIG. 1 while the coded signals stored in the shift registers $4_1', 4_2', \ldots, 4_n'$ are read out through the selector switches $S_2$ and $S_5$ into the data compressor 6 in a manner substantially similar to that described hereinbefore with reference to FIG. 1. Next the selector switches $S_1$ and $S_2$ are switched to the positions indicated by the broken lines. Then the coded signals of the next scanning line are fed from the analog-digital converter 3 through the selector switches $S_1$ into the shift registers $4_1, 4_2, \ldots, 4_n$ while those stored in the shift registers $4_1', 4_2', \ldots, 4_n'$ are read out through the selector switches $S_2$ and $S_5$ into the data compressor 6. It is seen that the selector switches $S_1$ and $S_2$ are switched every time when the scanning beam shifts from one scanning line to the next. It will be readily understood that the buffer 13 in the facsimile receiver shown in FIG. 1 may have an arrangement substantially similar to that shown in FIG. 2.

Figure 3:
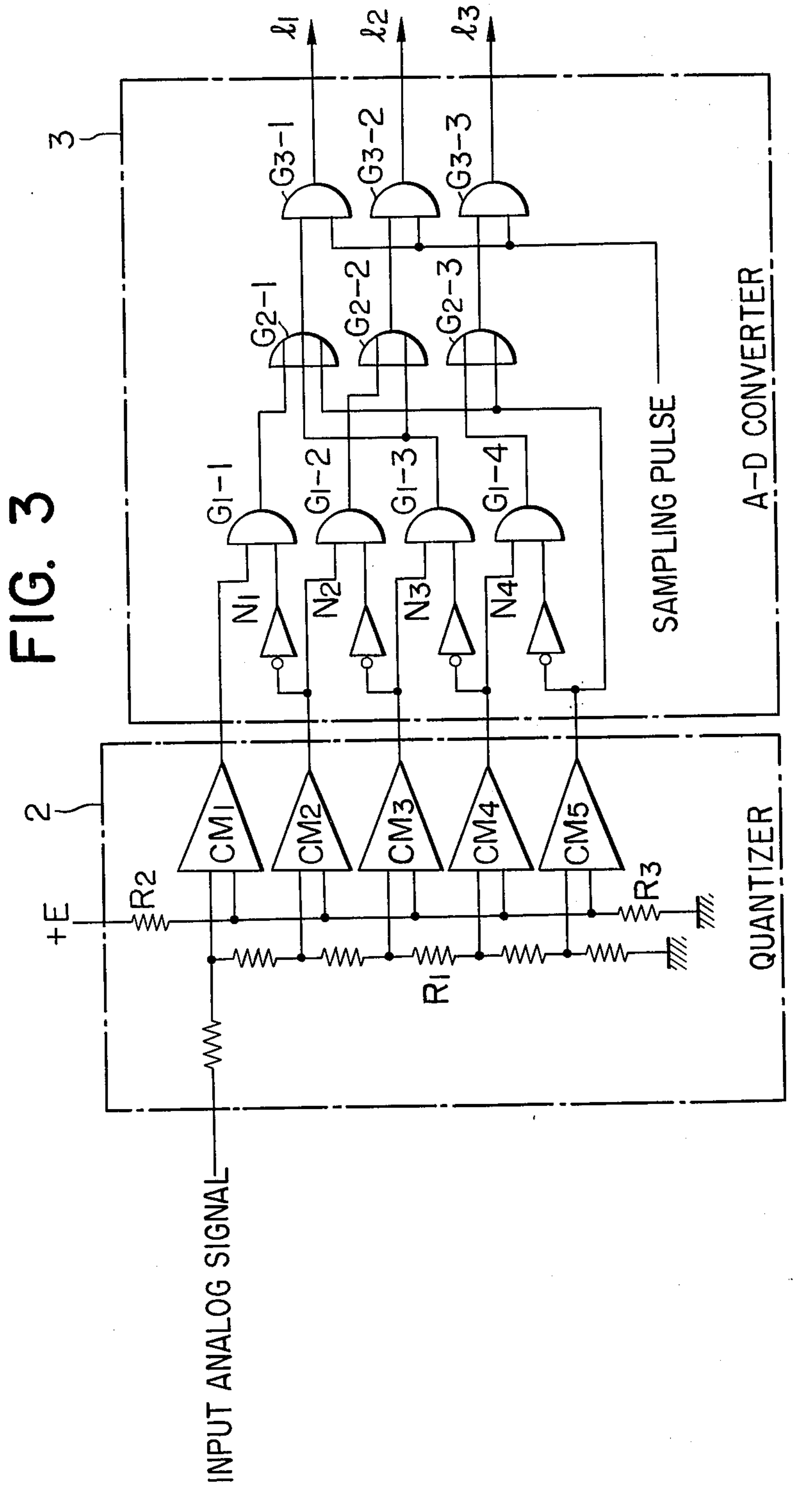
FIG. 3 is a circuit diagram of a quantizer 2 and an analog-digital converter 3 of the system shown in FIG. 1.

Next referring to FIG. 3 the quantizer 2 and the analog-digital converter 3 will be described in more detail hereinafter. The quantizer 2 is shown as comprising five comparators $CM_1$, $CM_2$, $CM_3$, $CM_4$ and $CM_5$. To one inputs of these comparators $CM_1$ — $CM_5$ are applied voltage signals obtained by dividing the analog input signal by a potentiometer $R_1$ whereas to the other inputs of the comparators $CM_1$ — $CM_5$ is applied a voltage +E of a power source through a resistor $R_2$. The threshold levels of the comparators $CM_1$ — $CM_5$ are determined by a resistor $R_3$ inserted between the other input terminal of the comparator $CM_5$ and the ground.

The agalog-digital converter 3 comprises inverters $N_1$, $N_2$, $N_3$ and $N_4$ connected to the comparators $CM_2$, $CM_3$, $CM_4$ and $CM_5$, respectively, and AND gates $G_1$—1, $G_1$—2, $G_1$—3, and $G_1$—4 whose one inputs are coupled to the outputs of the inverters $N_1$ — $N_4$, respectively, OR gates $G_2$—1, $G_2$—2 and $G_2$—3, and AND gates $G_3$—1, $G_3$—2, and $G_3$—3. It is readily seen that the analog input signals are converted into five discrete level signals, each of which is represented by the three-pulse or three-bit code. Three bits are transmitted in parallel from the analog-digital converter 3.

Assume that the level of the analog input to the quantizer 2 be so low that the comparator $CM_1$ gives the output signal 1. Then of the four AND gates $G_1$—1 — $G_1$—4 in the first AND gate stage, only the AND gates $G_1$—1 gives the output signal 1 whereas the AND gates $G_1$—1, $G_1$—2 and $G_1$—3 give the output signals 0s. As a result, the output of the OR gate $G_2$—1 is logic 1, and the output of the AND gate $G_3$—1, also logic 1. To the AND gates $G_3$—1, $G_3$—2 and $G_3$—3 are applied sampling pulses. The outputs of the AND gates $G_3$—2 and $G_3$—3 are logic 0s. Thus three bits are transmitted in parallel through the output lines $l_1$, $l_2$ and $l_3$, respectively. That is, the analog input signal is sampled, quantized and coded into the binary code "0 0 1". Next assume that the level of the analog input signal be such that the comparators $CM_1$, $CM_2$ and $CM_3$ give the output signals 1s. Then only the AND gate $G_1$—3 provides the signal 1 whereas the output signals of the AND gates $G_1$—1, $G_1$—2, and $G_1$—4 are 0s. Therefore the output signals of the OR gates $G_2$—1 and $G_2$—2 are 1s whereas the output signal of the OR gate $G_2$—3, 0. The output signals 1, 1 and 0 of the OR gates $G_2$—1, $G_2$—2, and $G_2$—3 are transmitted through the AND gates $G_3$—1, $G_3$—2 and $G_3$—3 onto the output lines $l_1$, $l_2$ and $l_3$, respectively, response to the sampling pluses. When the level of the analog input signal is such that all of the comparators $CM_1$ — $CM_5$ give the output signals 1s, the output signals of the inverters $N_1$ — $N_4$ are therefore 0s so that the outputs of the AND gates $G_1$—1, $G_1$—2, $G_1$—3 and $G_1$—4 are 0s. Since the output of the comparator $CM_5$ is directly connected to the OR gates $G_2$—1, and $G_2$—3 the outputs of the latter are 1s, and are transmitted through the AND gates $G_3$—1 and $G_3$—3 onto the output lines $l_1$ and $l_3$. Thus the output signals 1, 0 and 1 are transmitted through the output lines $l_1$, $l_2$ and $l_3$, respectively. In other words, the binary coded signal 1 0 1 is transmitted.

Figure 4:
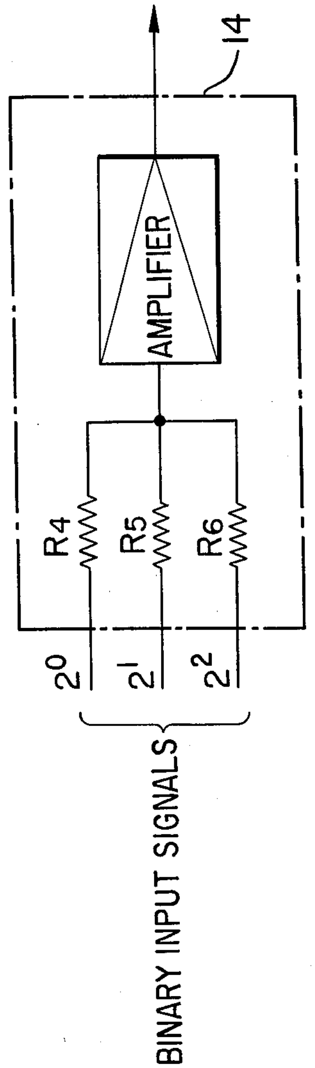
FIG. 4 is a circuit diagram of a digital-aganlog converter 14 shown in FIG. 1.

Next referring to FIG. 4, the digital-analog converter 14 in the facsimile receiver will be described in more detail hereinafter. Resistors $R_4$, $R_5$ and $R_6$ have weights corresponding to those of the digits of the binary input signals. For example when the resistor $R_4$ for the least significant digit has a resistance R, the resistor $R_5$ has a resistance R/2 and the resistor $R_6$, R/4. These resistors $R_4$, $R_5$ and $R_6$ are coupled to a amplifier AMP. Since the digital-analog converter 14 of the type shown in FIG. 4 is well known in the art no further explanation will be made in this specification.

It is to be understood that the preferred embodiment of the present invention described hereinbefore is illustrative rather than restrictive and that variations and modifications can be effected without departing from the true spirit of the present invention. For example, the binary coded signals may be transferred by a group of a plurality of digits in parallel to a data compressor. As with the case of the data compression method in which bit patterns of the adjacent scanning lines are simultaneously compressed, run-lengths of 1s and 0s in each group of a plurality of digits are converted into compressed data.

So far the present invention has been described as being applied to the transmission of a black-and-white halftone image, but it is to be understood that it is also applied to the transmission of a color image. In this case, three primary color signals may be transmitted separately in a manner substantially similar to that described hereinbefore. Furthermore the present invention may be also applied to the so-called digital telemetering system.

What is claimed is:

1. A data transmission system comprising means for quantizing each of a succession of analog input signals into a quantized signal, means for converting each of said quantized signals into a digital coded signal comprising a set of parallel bits, a plurality of storage means equal in number to the plurality of bits forming said digital coded signal, each storage means associated with a different order bit for storing therein the corresponding order bits of a succession of said digital coded signals, means for reading the bits stored in each of said plurality of storage means serially by storage means and serially by bit within each individual storage means and for carrying out data compression of the bit string read out of the storage means to provide a corresponding compressed data bit string, and means for transmitting the compressed data bit string.

2. A data transmission system as defined in claim 1 wherein said plurality of storage means comprises a plurality of serial-in, serial-out shift registers.

3. A data transmission system as defined in claim 2 wherein two shift registers are provided for storing the bits of each bit order of said digital coded signals, and means is provided for serially reading out the contents of one of the shift registers associated with each bit order while successive digital coded signals are being stored in the other shift registers associated with each bit order.

4. A data transmission system as defined in claim 1 wherein said analog input signals are analog video signals obtained by scanning a subject copy having a halftone image recorded thereupon.

5. A data transmission system as defined in claim 4 wherein said plurality of storage means comprise a plurality of shift registers capable of storing therein the bits of one scanning line.

6. A data transmission system comprising means for sampling and quantizing analog input signals into quantized signals, means for converting said quantized signals into digital coded signals, a first group of a plurality of storage means each for storing therein bits from the same bit position of said digital coded signals, means for reading the contents of each of said first group of a plurality of storage means serially by storage means and serially within each individual storage means to thereby form a bit string and for carrying out data compression of the read out bit string to provide compressed serial data, means for transmitting the compressed serial data, means for expanding the transmitted compressed serial data to reproduce the original bit string, a second group of a plurality of storage means each for storing therein the bits of the same bit position of said reproduced bit string, and means for reading out in parallel the contents of said plurality of storage means of said second group and for converting the groups of bits read out in parallel into analog signals.

7. A system comprising means for receiving a succession of N-bit digital words, where N is a positive integer, N storage means, each corresponding to a different order bit of an N bit digital word, means for storing serially in each of said storage means the corresponding order bits of said succession of received N-bit digital words, and means for subsequently reading out the contents of the storage means serially by storage means and serially by bit within a storage means, and for compressing the resulting single bit string to thereby provide a compressed digital signal.

8. A system as in claim 7 wherein each of said N storage means is a serial shift register.

9. A system as in claim 7 wherein said succession of digital words are derived by scanning a halftone subject copy and converting each resulting analog signal representing the brightness of an elementary area into an N-bit digital word.

10. A system as in claim 7 wherein each of said N storage means comprises a first and a second storage means, the means for storing bits in each of said N storage means comprises means for alternating between storing a succession of bits in all first storage means and storing a succession of bits in all second storage means, and the means for subsequently reading out the contents of the storage means comprises means for reading from those of the first and second storage means into which no storing is taking place.

11. A system as in claim 7 comprising means for receiving the compressed digital signal and for decompressing the received signal to provide a single bit string corresponding to the bit string read out from said N storage means, and means for converting the bit string resulting from decompression into the corresponding succession of N-bit digital words.

12. A system comprising means for receiving a serial succession of bits resulting from processing a succession of N-bit digital words by forming a succession of bit string, each bit string comprising the same order bits of all digital words, and data compressing the resulting succession of bit strings to provide said received succession of bits, N storage means each corresponding to a different order bit of an N-bit digital word, means for decompressing the received succession of bits to reconstruct said succession of bit strings, and means for storing each bit string into the corresponding order storage means, and means for reading out the contents of said N storage means in parallel by storage means but serially within a storage means, to thereby provide a reconstruction of said succession of N-bit digital words by forming a succession of N-bit digital words.

* * * * *